(12) United States Patent
Sitzmann

(10) Patent No.: US 12,123,548 B2
(45) Date of Patent: Oct. 22, 2024

(54) BODY SUPPORT DEVICE HAVING LOCKING LEG

(71) Applicant: Evolutionary Tools, Inc., Seattle, WA (US)

(72) Inventor: Beau Sitzmann, Seattle, WA (US)

(73) Assignee: Evolutionary Tools, Inc., Seattle, WA (US)

( * ) Notice: Subject to any disclaimer, the term of this patent is extended or adjusted under 35 U.S.C. 154(b) by 0 days.

(21) Appl. No.: 18/214,438

(22) Filed: Jun. 26, 2023

(65) Prior Publication Data

US 2024/0133516 A1  Apr. 25, 2024
US 2024/0230026 A9  Jul. 11, 2024

Related U.S. Application Data

(63) Continuation of application No. 17/723,206, filed on Apr. 18, 2022, now Pat. No. 11,686,432, which is a
(Continued)

(51) Int. Cl.
*B25H 5/00* (2006.01)
*F16M 11/04* (2006.01)
(Continued)

(52) U.S. Cl.
CPC .......... *F16M 13/04* (2013.01); *F16M 11/046* (2013.01); *F16M 11/16* (2013.01); *F16M 11/2021* (2013.01)

(58) Field of Classification Search
CPC ...... F16M 13/04; F16M 11/046; F16M 11/16; F16M 11/2021
See application file for complete search history.

(56) References Cited

U.S. PATENT DOCUMENTS 699,932 A    5/1902  Smith
1,417,250 A   5/1922  Kelly
(Continued)

OTHER PUBLICATIONS

International Search Report and Written Opinion dated Feb. 4, 2016, issued in corresponding International Application No. PCT/US2015/62313, filed Nov. 24, 2015, 9 pages.
(Continued)

*Primary Examiner* — Amy J. Sterling
(74) *Attorney, Agent, or Firm* — Polsinelli PC

(57) ABSTRACT

A body support device in accordance with one embodiment of the present disclosure includes a body attachment portion configured for attaching the body support device to a body of a user, wherein the body attachment portion has a first side and a second side, therein the first side is configured for coupling with the body of the user and wherein the second side is configured for facing away from the body of the user, a leg having an elongate body, a first end having a coupling interface configured for attachment with the second side of the body attachment portion and a second end extending from the body attachment portion, wherein the coupling interface includes a hinge assembly such that the leg is configured for movement within a pivot range, and a locking assembly for locking the leg in a fixed position relative to the body attachment portion within the pivot range.

15 Claims, 17 Drawing Sheets

Related U.S. Application Data continuation of application No. 17/081,671, filed on Oct. 27, 2020, now Pat. No. 11,306,869, which is a continuation of application No. 16/011,199, filed on Jun. 18, 2018, now Pat. No. 10,823,330, which is a continuation of application No. 14/950,709, filed on Nov. 24, 2015, now Pat. No. 10,001,246.

(60) Provisional application No. 62/146,095, filed on Apr. 10, 2015, provisional application No. 62/085,214, filed on Nov. 26, 2014.

(51) Int. Cl.
 *F16M 11/16* (2006.01)
 *F16M 11/20* (2006.01)
 *F16M 13/04* (2006.01)

(56) References Cited

U.S. PATENT DOCUMENTS

| | | | |
|---|---|---|---|
| 2,288,013 A | 6/1942 | Moynahan | |
| 4,058,119 A | 11/1977 | Rosequist | |
| 4,565,409 A * | 1/1986 | Hollonbeck | A47C 16/00 297/411.36 |
| 4,637,536 A | 1/1987 | Wong | |
| 4,964,553 A | 10/1990 | Glynn | |
| 5,326,122 A | 7/1994 | Duffy | |
| D365,695 S * | 1/1996 | Sibbitt, Sr. | D6/364 |
| 5,733,011 A * | 3/1998 | Young | A47C 9/002 297/195.11 |
| 5,876,361 A | 3/1999 | Harris | |
| 6,799,592 B1 | 10/2004 | Reynolds | |
| 6,834,916 B2 * | 12/2004 | Volkman | A47C 3/029 297/338 |
| 6,883,177 B1 * | 4/2005 | Ouellette | A41D 13/065 2/24 |
| 7,303,537 B1 | 12/2007 | Snyder et al. | |
| 7,325,868 B2 | 2/2008 | West et al. | |
| 7,980,625 B2 * | 7/2011 | Worthington | A47C 16/00 248/397 |
| 8,403,408 B2 * | 3/2013 | Hosler | A47C 9/025 297/4 |
| 8,888,188 B2 * | 11/2014 | Moffat | A47C 3/16 297/423.11 |
| 9,968,195 B2 * | 5/2018 | Sheinkop | A47C 7/006 |
| 10,271,660 B2 * | 4/2019 | Gunura | A61F 5/0125 |
| 11,306,869 B2 * | 4/2022 | Sitzmann | F16M 13/04 |
| 2001/0047904 A1 | 12/2001 | Antonio | |
| 2002/0100846 A1 | 8/2002 | Tinsley | |
| 2003/0034037 A1 | 2/2003 | Klemm | |
| 2012/0311757 A1 * | 12/2012 | Miller | A61F 5/028 2/44 |
| 2013/0067642 A1 | 3/2013 | Chen | |

OTHER PUBLICATIONS

International Preliminary Report on Patentability and Written Opinion dated May 30, 2017, issued in corresponding International Application No. PCT/US2015/62313, filed Nov. 24, 2015, 7 pages.

* cited by examiner

BODY SUPPORT DEVICE HAVING LOCKING LEG

CROSS-REFERENCES TO RELATED APPLICATIONS

This application is a continuation of U.S. patent application Ser. No. 17/723,206, filed Apr. 18, 2022 (to issue as U.S. Pat. No. 11,686,432), which is a continuation of U.S. patent application Ser. No. 17/081,671, filed Oct. 27, 2020 (issued as U.S. Pat. No. 11,306,869), which is a continuation of U.S. patent application Ser. No. 16/011,199, filed Jun. 18, 2018 (issued as U.S. Pat. No. 10,823,330), which is a continuation of U.S. patent application Ser. No. 14/950,709, filed Nov. 24, 2015 (issued as U.S. Pat. No. 10,001,246), which claims the benefit of U.S. Provisional Application No. 62/085,214, filed Nov. 26, 2014, and U.S. Provisional Application No. 62/146,095, filed Apr. 10, 2015, the disclosures of which are expressly incorporated herein by reference in their entireties.

BACKGROUND

People who work on their hands and knees often suffer great lower back, knee, and wrist pain from long hours of working in that position. Therefore, there exists a need for a support device for working on hands and knees for daily work and also for people recovering from an injury.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment of the present disclosure, a body support device is provided. The body support device includes: a body attachment portion configured for attaching the body support device to a body of a user, wherein the body attachment portion has a first side and a second side, therein the first side is configured for coupling with the body of the user and wherein the second side is configured for facing away from the body of the user; a leg having an elongate body, a first end having a coupling interface configured for attachment with the second side of the body attachment portion and a second end extending from the body attachment portion, such that the leg is configured for hinged movement relative to the body attachment portion within a pivot range; and a locking assembly for locking the leg in a fixed position relative to the body attachment portion within the pivot range.

In another embodiment of the present disclosure, a body support device is provided. The body support device includes: a body attachment portion configured for attaching the body support device to a body of a user, wherein the body attachment portion has a first side and a second side, therein the first side is configured for coupling with the body of the user and wherein the second side is configured for facing away from the body of the user; and a leg assembly including a leg having an elongate body, a first end having a coupling interface configured for attachment with the second side of the body attachment portion and a second end extending from the body attachment portion, wherein the coupling interface includes at least a portion of a hinge assembly such that the leg is configured for movement within a pivot range, and a locking assembly for locking the leg in a fixed position relative to the body attachment portion within the pivot range.

In another embodiment of the present disclosure, a method of using a body support device is provided. The method includes: attaching a body attachment portion configured to the body of a user, wherein the body attachment portion has a first side and a second side, therein the first side is configured for coupling with the body of the user and wherein the second side is configured for facing away from the body of the user; positioning a leg in a fixed position relative to the body attachment portion, the leg having an elongate body, a first end having a coupling interface configured for attachment with the second side of the body attachment portion and a second end extending from the body attachment portion, such that the leg is configured for hinged movement relative to the body attachment portion within the pivot range; and locking the leg in the fixed position within the pivot range using a locking assembly.

In any of the embodiments described herein, the locking assembly may include a locking arm, the locking arm extending between the leg to a portion on the second side of the body attachment portion.

In any of the embodiments described herein, the locking arm may be configured to prevent pivoting movement of the elongate member relative to the body attachment portion.

In any of the embodiments described herein, the locking assembly may be adjustable for locking the leg in a plurality of fixed positions relative to the body attachment portion within the pivot range.

In any of the embodiments described herein, the locking assembly may be configured to lock when engaged by the user.

In any of the embodiments described herein, the locking assembly may be configured to release when disengaged by the user.

In any of the embodiments described herein, the body support device may further include a hinge assembly.

In any of the embodiments described herein, the hinge assembly may include a first hinging portion and a second hinging portion.

In any of the embodiments described herein, the second hinging portion may be configured for pivotal movement relative to the first hinging portion.

In any of the embodiments described herein, the second hinging portion may be coupled to the elongate member, such that the elongate member is configured for hinging movement between extended and retracted positions.

DESCRIPTION OF THE DRAWINGS

The foregoing aspects and many of the attendant advantages of the disclosed embodiments will become more readily appreciated as the same become better understood by reference to the following detailed description, when taken in conjunction with the accompanying drawings, wherein.

DETAILED DESCRIPTION

Figure 1:
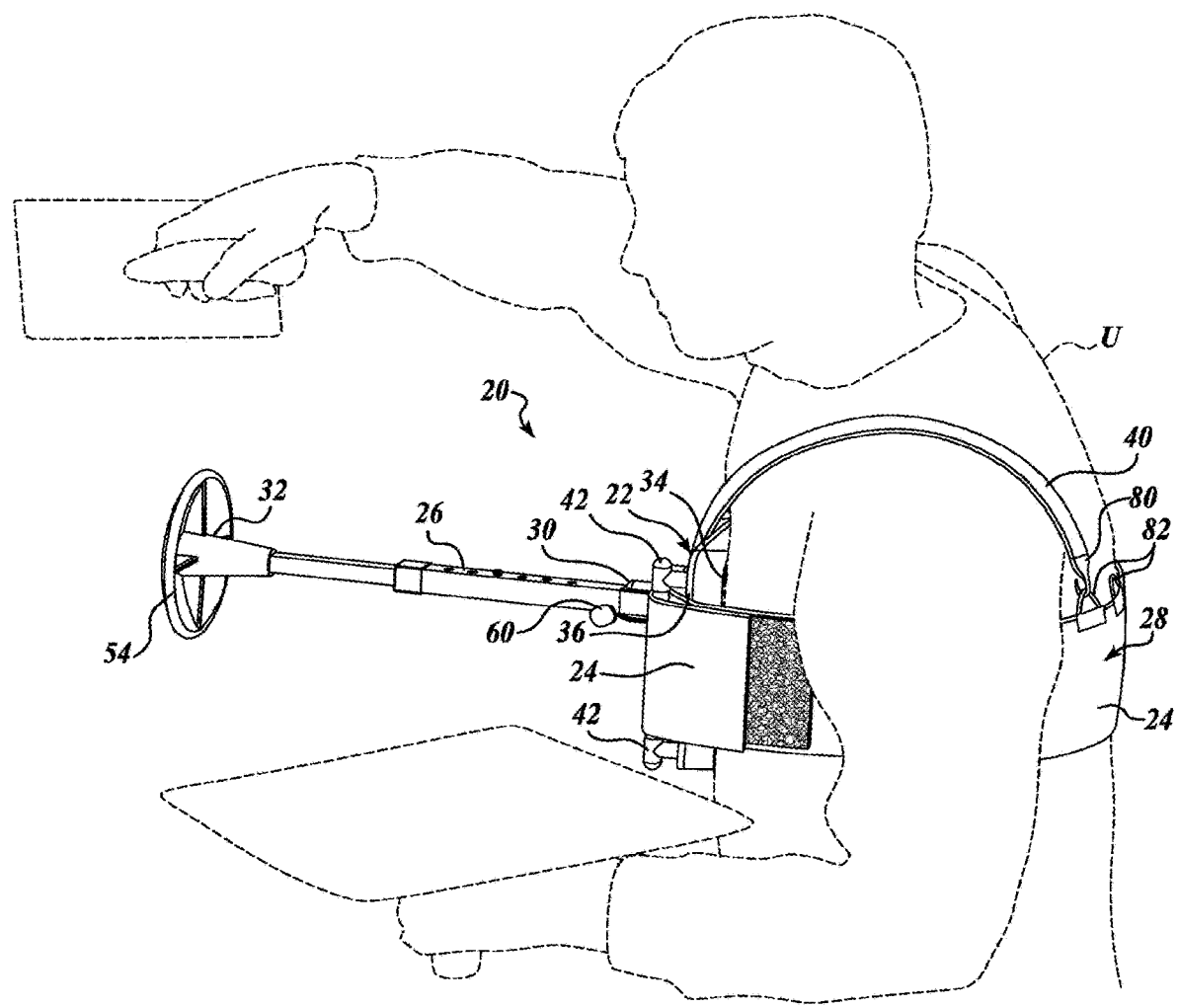
FIG. 1 depicts an embodiment of a user in an upright position and using a chest-mounted support device, in accordance with the embodiments disclosed herein.

Embodiments of the present disclosure are directed to a chest-mounted support device. In accordance with one embodiment of the present disclosure, a chest-mounted support device 20 can be seen in FIGS. 1-11. The support device 20 includes a chest plate 22, a body strap 24 configured to couple the chest plate 22 to a user U, and a leg 26 have a proximal end 30 and a distal end 32. The proximal end 30 is coupled to the chest plate 22 and the distal end 32 is configured to extend outwardly from the chest plate 22 and the body of the user U.

Figure 4:
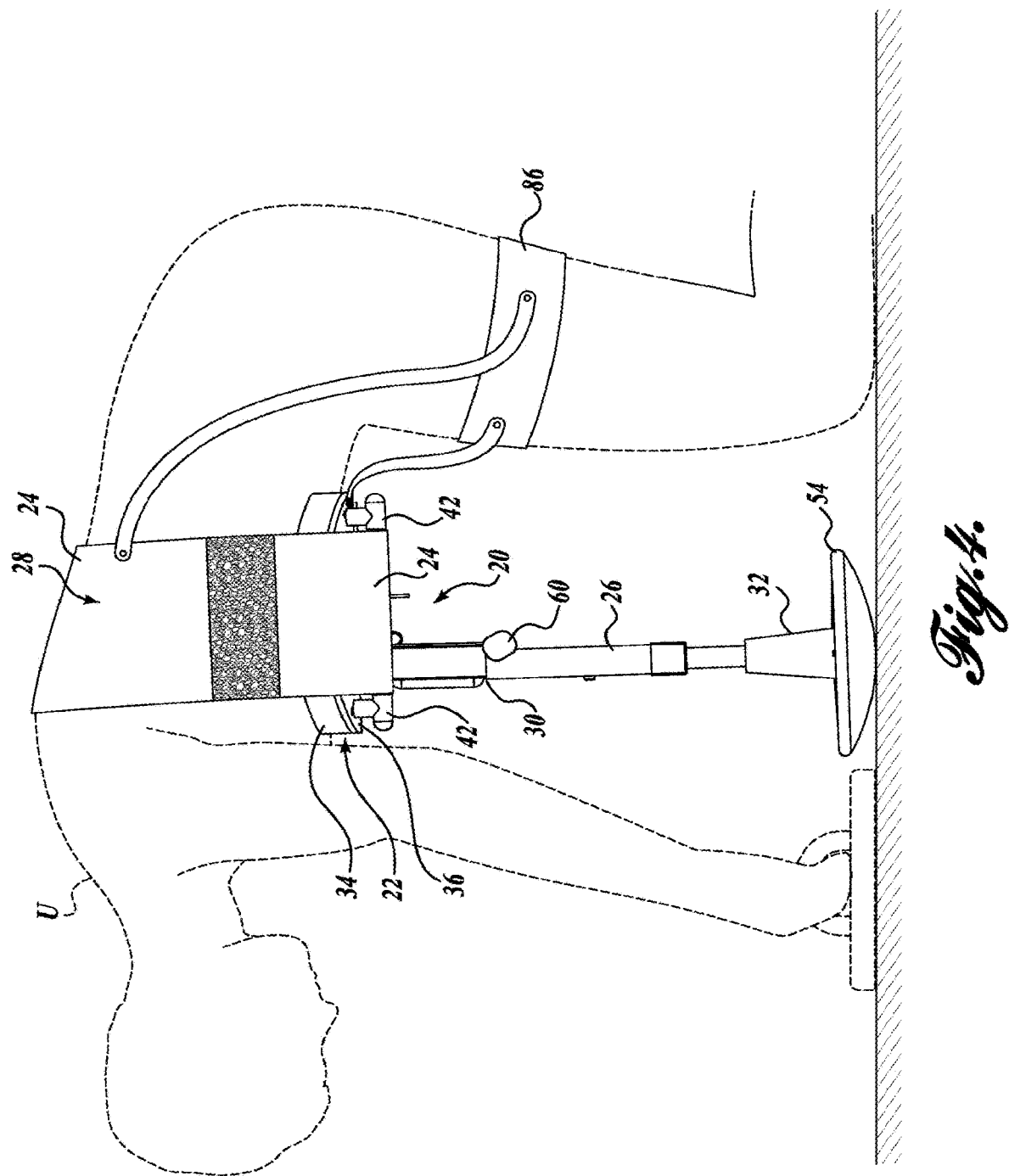
FIG. 4 depicts a side view of the user and the support device depicted in FIG. 1, with the user in a kneeling position and the leg extending approximately perpendicular to a chest plate of the support device.

The support device 20 is designed and configured to provide support of a user's upper body weight to alleviate stress and strain from the weight of the upper torso on the lower back, spine, knees, and muscles as well as evenly distributing body weight to at least three points when in a kneeling position: two knees and the chest (see FIG. 4). The support device 20 also frees up both hands for working. The support device 20 can also be used in an upright position, for example, to gain support from a wall (see FIG. 2). In general, the support device 20 helps alleviate the effects of unnatural weight loads on a user's body due to work or other demands.

The support device 20 may be used in any of a number of working applications including, but not limited to, flooring, painting, plumbing, carpentry, electrical, tile and masonry, mechanics, gardening, home and commercial cleaning, auto detailing, factory line work, agricultural work (e.g., harvesting), etc.

Referring to FIG. 1, the chest plate 22 is a shield or plate having a first side 34 and a second side 36. The first side 34 is designed for placement against the body of the user. The second side 36 is an outwardly extending side. In one embodiment of the present disclosure, the first side 34 may include a padding material to provide comfort to the user. In one example, the padding material includes closed cell, high density foam with a thickness in a range from about 0.5 inches to about 2.0 inches. The first side 34 may be ergonomically conformed to the user's body. For example, the first side 34 may be contoured to fit securing against the contours of a human body. Likewise, the second side 36 may also be contoured to have a substantially uniform thickness along the cross section of the chest portion.

The second side 36 may be configured from a rigid material to provide structure to the chest-mounted support device 20. For example, the second side 36 may be configured from a rigid plastic or metal material.

The chest plate 22 is sized to provide body support to a user U, whether the user U is in a standing, angled, or full horizontal position. In the illustrated embodiment, the chest plate 22 is designed to extend across most of the width of a user's chest and to have a near center point aligned with the sternum of the user. In some embodiments of the present disclosure, the chest plate 22 may be sized larger to provide additional body support for a user. For example, in a cement work application, the user U may want to rest his full body weight on the support device. In this application, a larger chest plate 22 may be advantageous. In some embodiments of the present disclosure, the chest plate 22 and/or the padding material on the first side 34 of the chest plate us contoured based on a gender of a user (e.g., based on female anatomy or male anatomy).

The chest plate 22 may have a series of holes 38 extending through the first side 34 and the second side 36 to provide breathability and comfort for the user U.

A body attachment portion 28 attaches the chest plate 22 to the user's body. In the illustrated embodiment, the body attachment portion 28 includes a body strap 24 used to wrap around the user's torso and attach the chest plate 22 to the user's body. The body strap 24 may be a flexible fabric strap for comfort and ease of use. The body strap 24 may be configured to have an adjustable length. Such adjustment may be achieved by belt buckles, hook and loop fasteners, clamp-type fasteners, or any other suitable adjustment mechanism. In the illustrated embodiment, the body attachment portion 28 also includes a shoulder strap 40 used to provide additional stability of the chest plate 22 to the user's body. The chest plate 22 includes a hook fastener 80 and the body strap includes a plurality of loops 82. The hook fastener 80 is configured to be fastened to one of the plurality of loops 82 at any given time. The user U may fasten the hook fastener 80 to a particular one of the plurality of loops 82 depending on the size of the user's chest. The shoulder strap 40 may carry little or no load during use of the support device 20. However, the shoulder strap 40 can provide support to the support device 20 while the user is putting on the support device 20 and/or when the user is in a sitting position.

The body strap 24 is attached to the chest plate 22 by a strap attachment portion 42. In the illustrated embodiment, the strap attachment portion 42 includes two rods positioned outwardly from the second side 36 of the chest plate 22. The rods are oriented substantially vertical when the user U is standing vertically (see FIG. 2). One end of the body strap 24 slides between a first rod and the second side 36 of the chest plate 22, wraps around the first rod, and is secured to another portion of the body strap 24. The other end of the body strap 24 is secured around a second rod in similar fashion. The rods provide points of leverage that allow the body strap 24 to be pulled tightly to create a snug fit of the chest plate 22 against the user's body. The rods are positioned outwardly from the second side 36 of the chest plate 22 to provide leverage for the user when fitting the body strap 24 to the user's body.

Although the strap attachment portion 42 is shown as two rods, the strap attachment portion 42 may include just one rod. In such an embodiment, one end of the body strap 24 may be fixed to one side of the chest plate 22 and the other end of the body strap is capable of adjustment to the single rod on the other side of the chest plate 22. Other embodiments of body attachment portions are also within the scope of the present disclosure. For example, the body strap may be received in longitudinal slots extending through the chest plate.

The shoulder strap 40 may be used to help maintain the positioning of the chest plate 22 on the user's body. In the illustrated embodiment, one end of the shoulder strap 40 is attached to the second side 36 of the chest plate 22 and the other end of the shoulder strap 40 is attached to the body strap 24. In one embodiment, the point at which the shoulder strap 40 attached to the body strap 24 is adjustable along the length of the body strap 24 to accommodate users of different sizes.

In another embodiment of the body attachment portion 28, one or more leg straps 86 may be used to further maintain the positioning of the chest plate 22 on the user's body. The one or more leg straps 86 are coupled to the chest plate 22 and/or the body strap 24 and extend around the tops of the user's legs. In one example, the one or more leg straps 86 are configured to transfer some or all of the load from the chest plate 22 to the user's legs. This arrangement can reduce the load on the user's spine and/or lower back. In another example, when a user is using the support device 20 in a horizontal position, the one or more leg straps 86 can act as a governor by pulling taught when the user leans forward a certain distance. The user can interpret the one or more leg straps 86 pulling taught as a warning that the user is getting too far forward over the support device 20 and return back to a safe position before the user falls forward over the top of the support device 20. In another example, when a user is using the support device 20 in a standing position (e.g., when performing a standing assembly line job), most all of the load from a user is carried through the one or more leg straps 86. In one particular example, when the user is leaning on a table and the user's foot touches the table, the load would be carried by the one or more leg straps 86.

Figure 2:
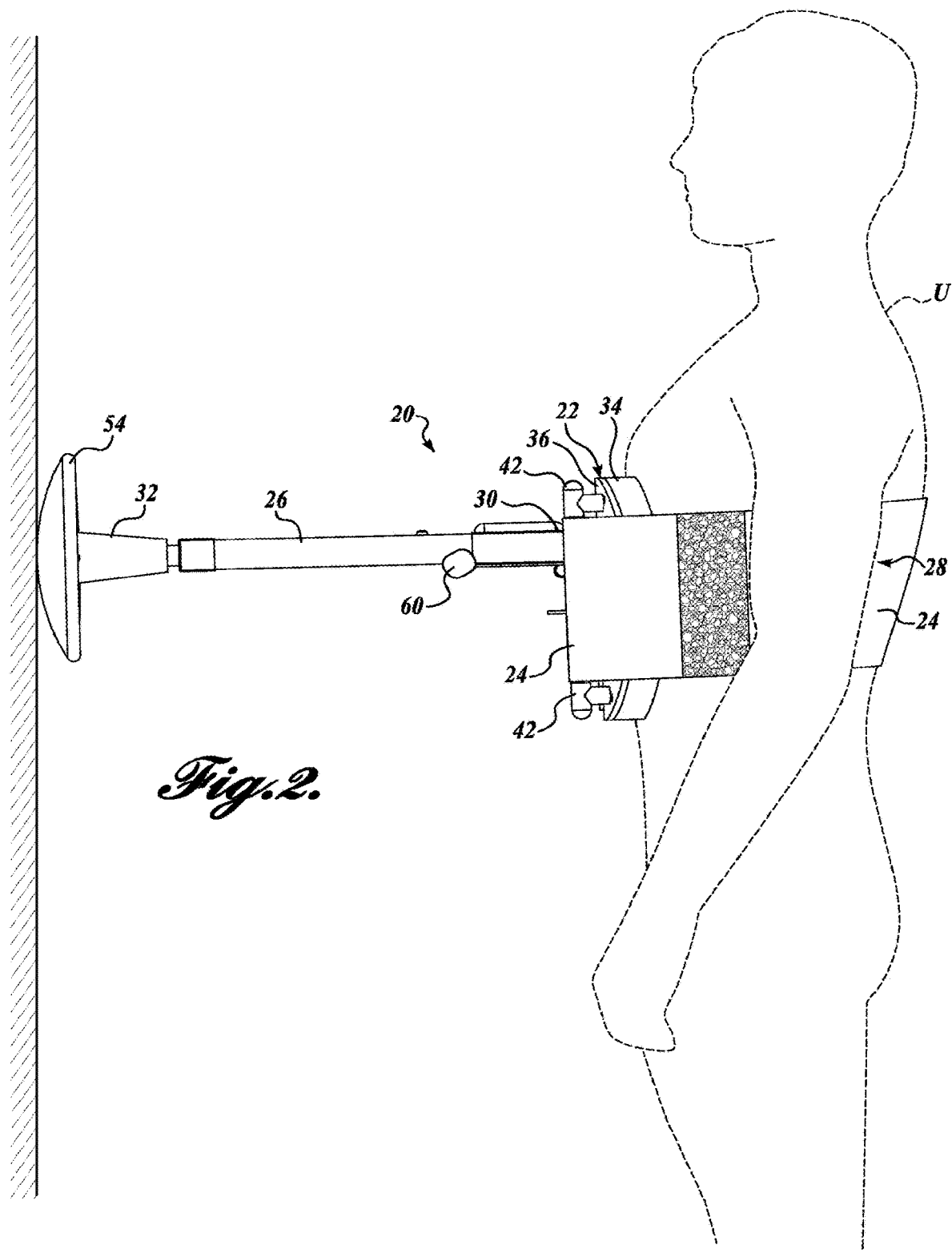
FIG. 2 depicts a side view of the user and the support device depicted in FIG. 1, with a leg of the support device extending out at an angle of about 90 degrees from vertical.
Figure 3:
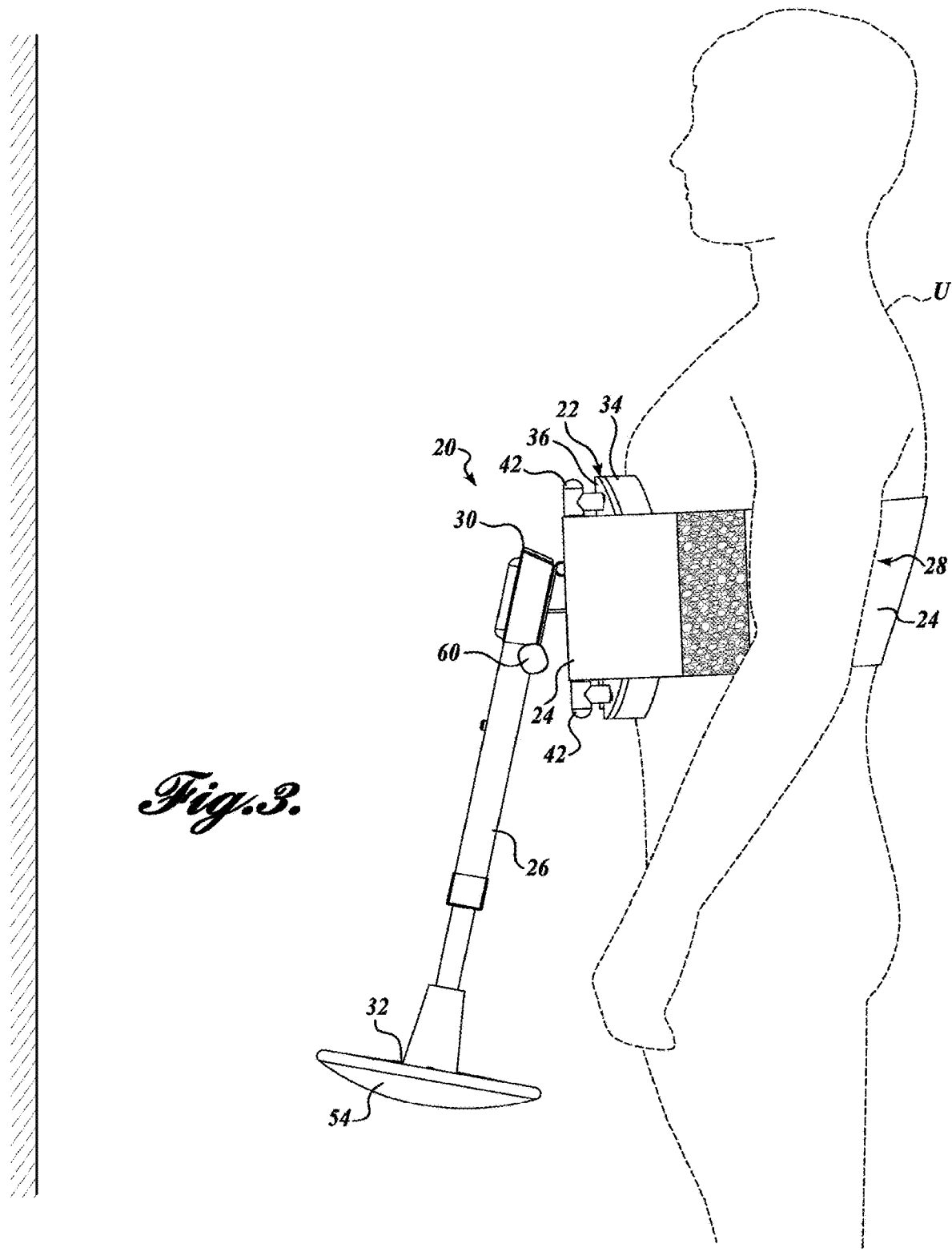
FIG. 3 depicts a side view of the user and the support device depicted in FIG. 1, with a leg of the support device extending out at an angle of about 5 degrees from vertical.

The leg 26 can be configured to extend outwardly from the chest plate 22 and, when worn by a user, from the body of the user U. In the illustrated embodiment, the leg 26 is a telescoping leg that permits the length of the leg 26 to be adjusted. However, the leg 26 could also have a fixed length. One benefit to the telescoping leg is that it permits the user U to adjust the length of the leg, as may be preferable depending on the particular use of the support device 20. For example, the user U may prefer a one length of the leg 26 when standing vertically with the leg 26 against a wall (as illustrated in FIG. 2) and a different length when positioned horizontally with the leg 26 braced against the ground.

Figure 5:
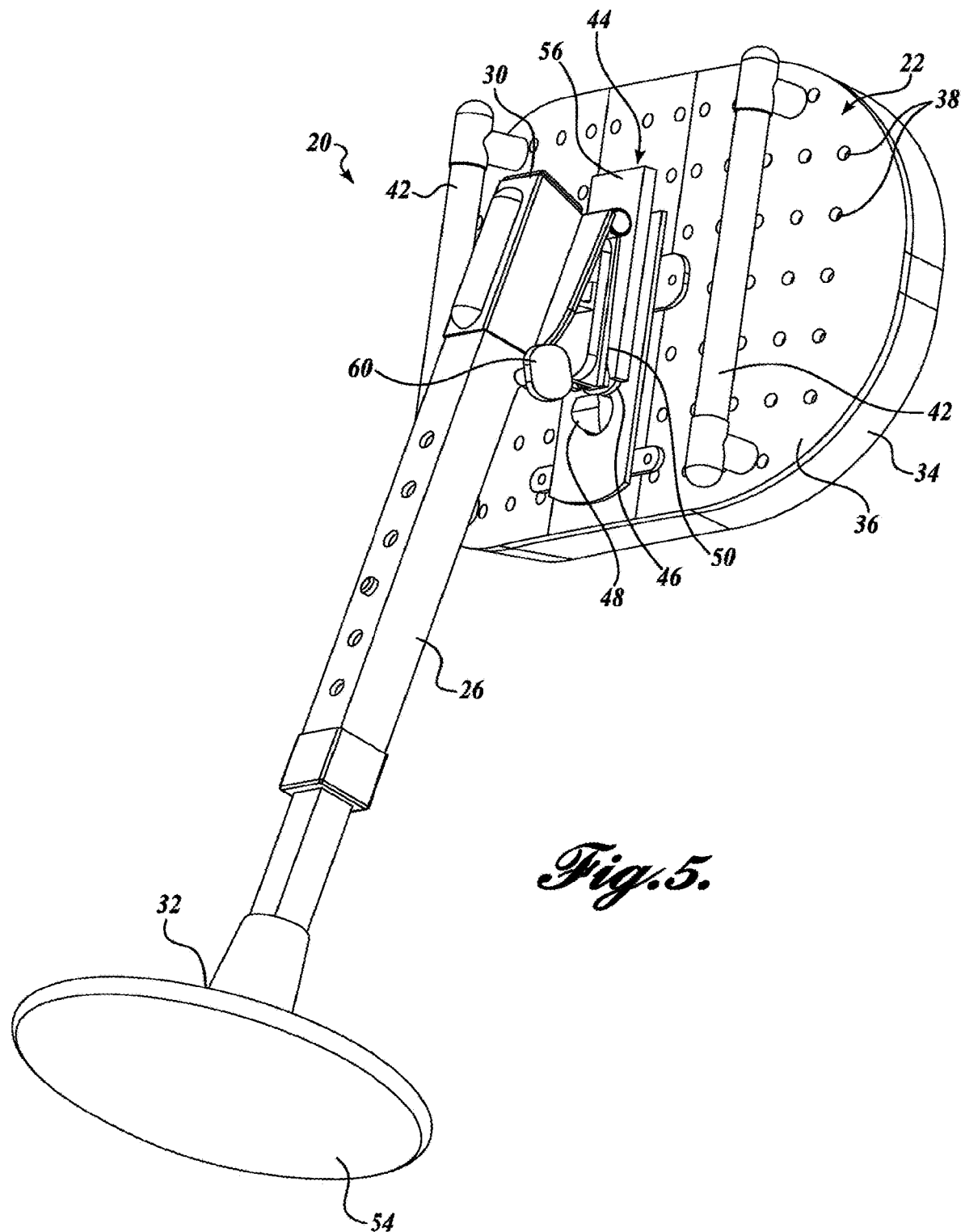
FIG. 5 depicts a front perspective view of the support device depicted in FIG. 1 without the user.
Figure 6:
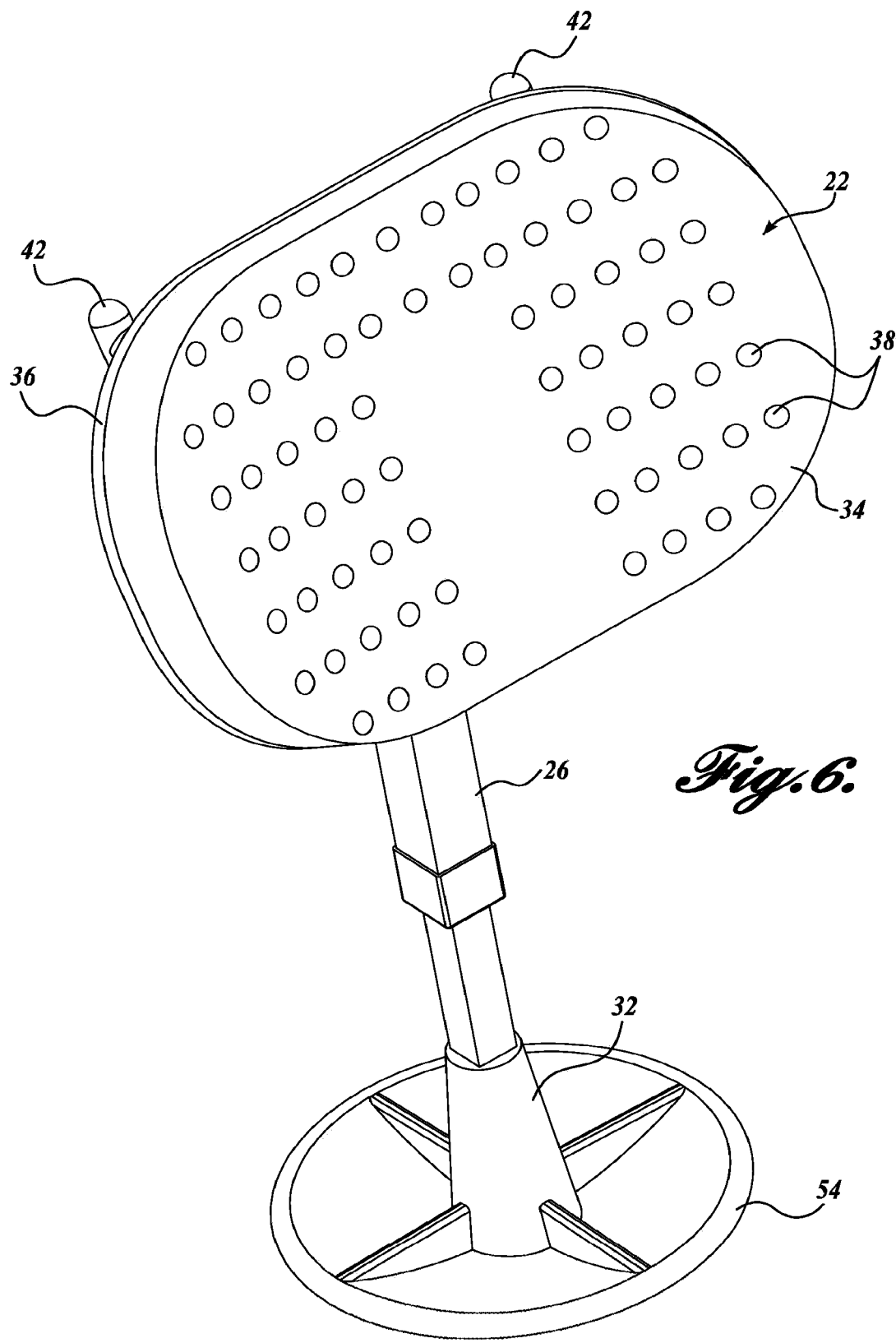
FIG. 6 depicts a back perspective view of the support device depicted in FIG. 1 without the user.
Figure 7:
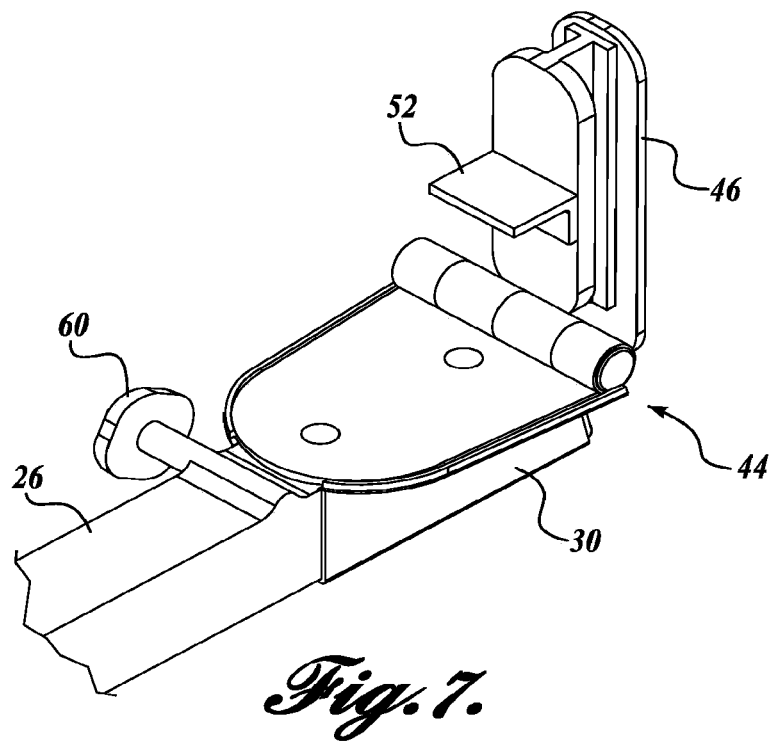
FIGS. 7 and 8 depict partial views of the leg and a coupling mechanism of the support device depicted in FIG. 1.
Figure 8:
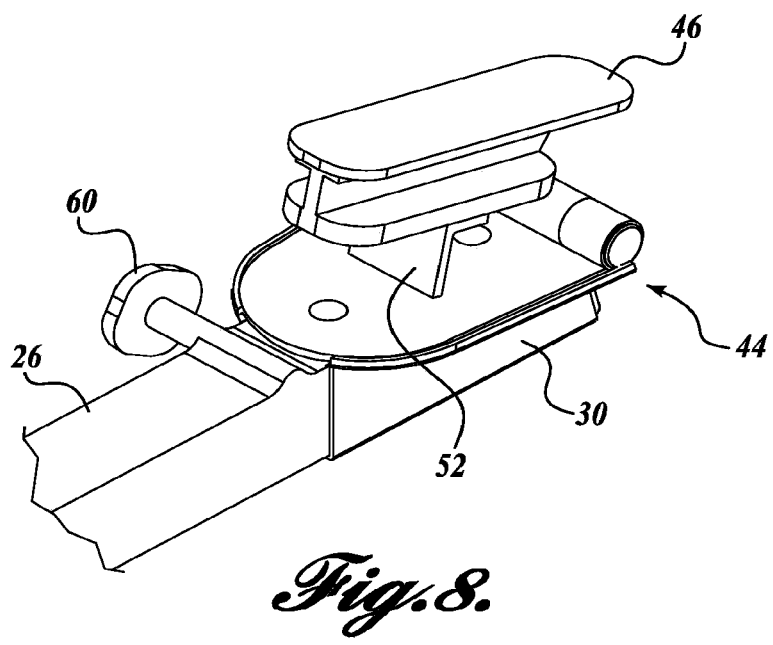
Figure 9:
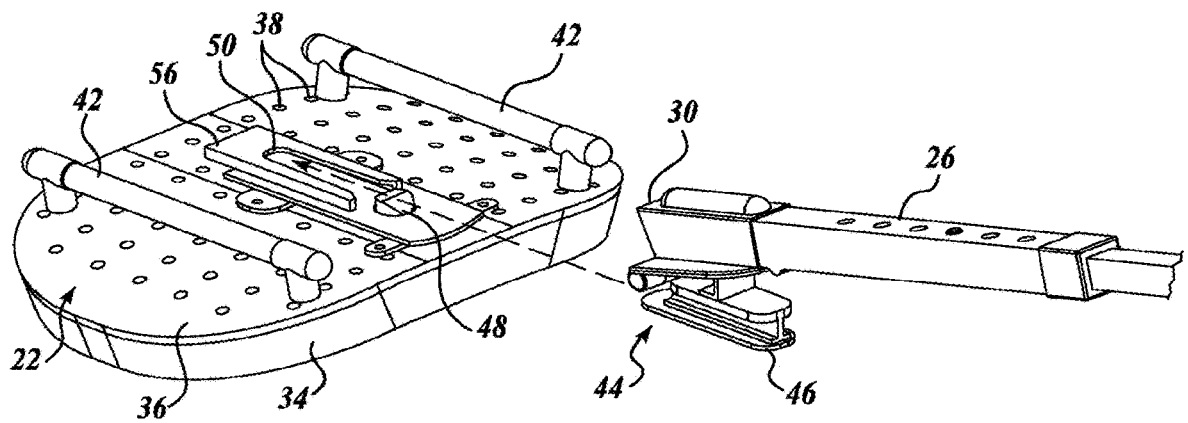
FIGS. 9 and 10 depict an embodiment of coupling the leg to the chest plate of the support device depicted in FIG. 1.
Figure 10:
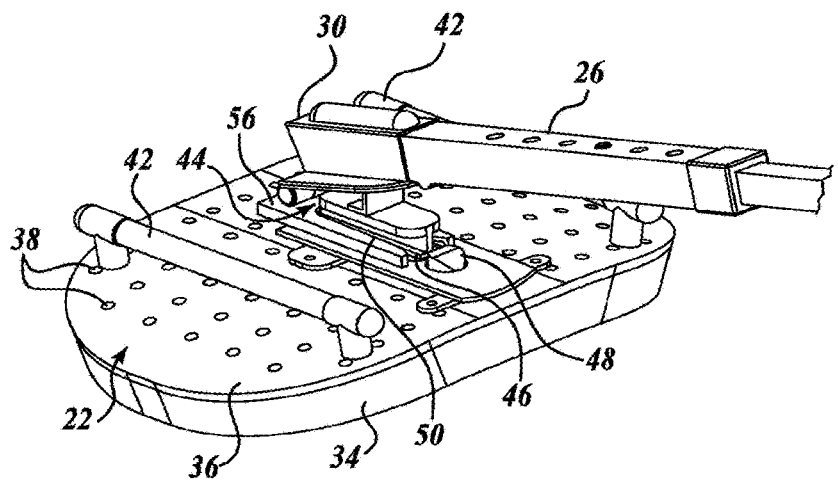
Figure 11:
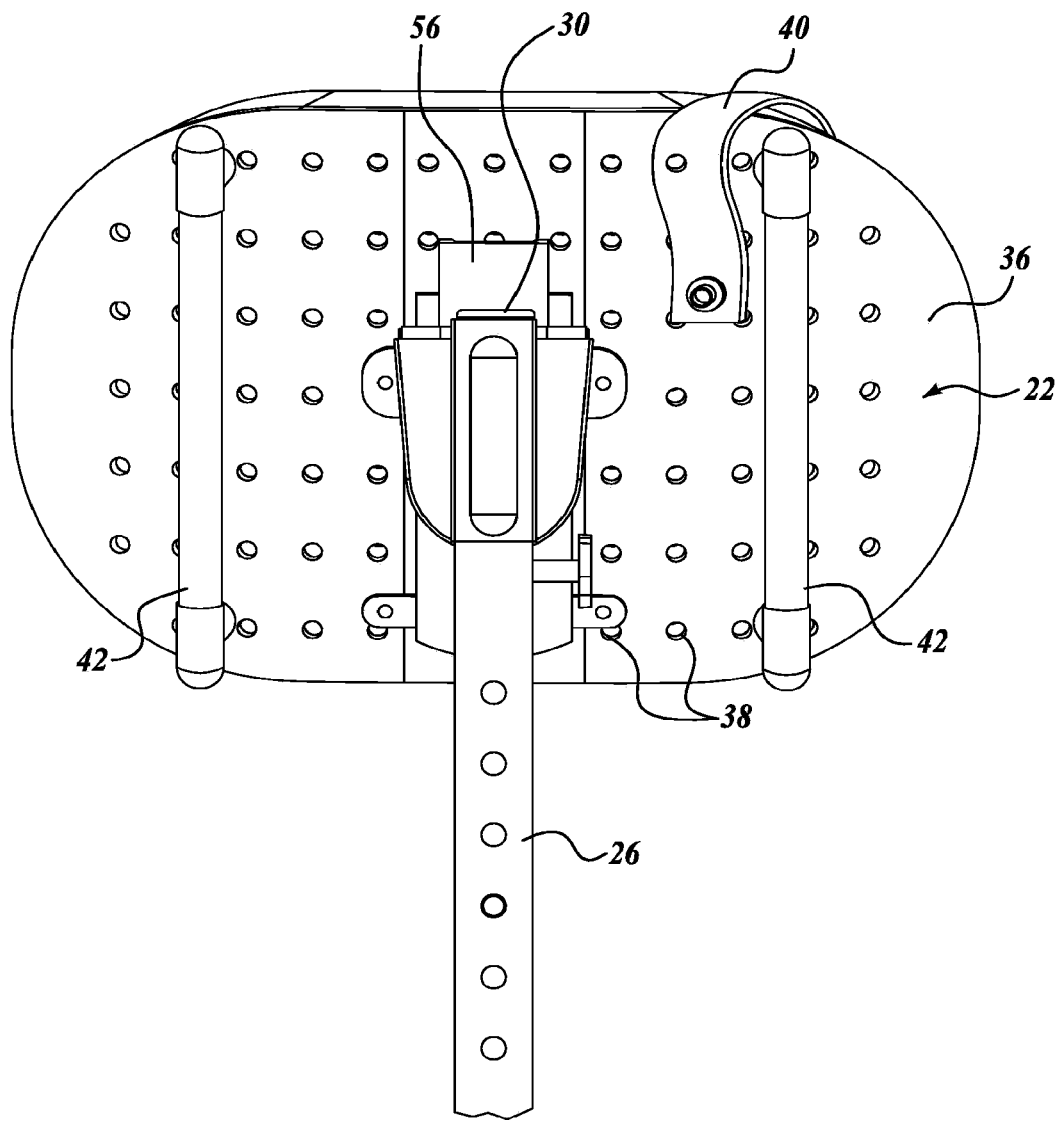
FIG. 11 depicts a front view of a front of the support device depicted in FIG. 1 with the leg pointing at an angle of 0 degrees from vertical.

In the illustrated embodiment of FIG. 5, the leg 26 has a coupling interface 44 configured to couple the leg 26 to the chest plate 22 and to permit the leg 26 to pivot when coupled to the chest plate 22. In one embodiment, when the leg 26 is coupled to the chest plate 22 and the user U is standing vertically (see FIG. 2), the coupling interface 44 permits the leg 26 to pivot about an axis that is substantially horizontal and substantially parallel to the chest plate 22. In other words, the coupling interface 44 permits the leg 26 to pivot in a plane that is substantially perpendicular to the chest plate 22.

In one embodiment, the leg 26 is configured to pivot in a pivot range. In one embodiment, the pivot range is between 0 degrees from vertical (i.e., with the leg 26 pointed directly down when the user is standing vertically) and about 90 degrees from horizontal and about 90 degrees from vertical (i.e., the position shown in FIG. 2 with the leg 26 substantially perpendicular to the chest plate 22). In another embodiment, the range is between about 5 degrees from vertical (i.e., the position shown in FIG. 3 with the leg 26 not entirely vertical) and about 85 degrees from vertical. Stops, described in greater detail below, are used to control the pivot range of the leg 26. During usage of the support device 20, the hinged movement of the leg 26 to the chest plate 22 allows for some rocking motion of the leg 26 when it is supporting the user. Such rocking motion allows the user to move constantly while being supported by the leg. In one embodiment, the leg 26 is coupled to the chest plate 22 via a ball joint.

In some embodiments, the coupling interface 44 is configured such that leg 26 and/or the pivot axis between the leg 26 and the chest plate 22 are in particular locations. In one embodiment, the coupling interface 44 is configured such that the leg 26 is horizontally centered on the chest plate 22. In another embodiment, the coupling interface 44 is configured such that the pivot axis is vertically centered on the chest plate. In yet another embodiment, the coupling interface 44 is configured such that the pivot axis is located vertically at a position between the center of the chest plate and three fourths of the distance from the bottom of the chest plate 22 to the top of the chest plate 22. Locating the pivot axis vertically above the center of the chest plate 22 may help avoid the user in a kneeling position from falling face-first over the top of the leg 26.

In the illustrated embodiment, the coupling interface 44 includes a latchplate 46 that is configured to interact with a releasable buckle 48. In one embodiment, the releasable buckle 48 is biased to an extended position (as shown in FIG. 5), but is capable of being pushed back into the chest plate under certain conditions. For example, as the latchplate 46 is moved vertically upward into the releasable buckle 48, the latchplate 46 may cause the releasable buckle 48 to retract until the latchplate 46 is above the releasable buckle 48, at which point the releasable buckle 48 holds the latchplate 46 in place. In another embodiment, the releasable buckle 48 is similar to a seatbelt buckle that receives the latchplate 46. Any number of other embodiments of releasable buckle 48 can be used. The releasable buckle 48 may include a release mechanism (e.g., a quick release mechanism) that, when activated, causes the releasable buckle 48 to retract and permits the latchplate 46 to be uncoupled from the releasable buckle 48. In some embodiments, the user may use a single hand to release the latchplate 46 from the releasable buckle 48. While the illustrated embodiment includes a latchplate 46 and a releasable buckle 48, other coupling mechanisms are usable to releasably couple the leg 26 to the chest plate 22 and within the scope of the present disclosure.

In the illustrated embodiment, the chest plate 22 incudes a latchplate stability component 50. To couple the leg 26 to the chest plate 22, the latchplate 46 is inserted through the latchplate stability component 50 until the latchplate 46 is coupled to the releasable buckle 48. In the illustrated embodiment, the latchplate stability component 50 includes a channel through which the latchplate 46 is inserted (see FIGS. 9 and 10). In another embodiment, the latchplate stability component 50 includes a series of slots or a series of slots and channels through which the latchplate 46 is inserted. The latchplate stability component 50 provides lateral stability to the leg 26 when coupled to the chest plate 22 to prevent movement and/or rotation of the leg 26 (aside from any intended pivoting of the leg 26 in the pivot range).

In some embodiments, the chest plate 22 and the latchplate stability component 50 are made from rigid materials, such as a metal material, a hard plastic material, and/or a composite material. In some embodiments, the latchplate stability component 50 is fixedly attached to the chest plate 22. For example, in the case where the chest plate 22 and the latchplate stability component 50 are made from metal materials, the latchplate stability component 50 may be welded to the chest plate 22. In some embodiments, the latchplate stability component 50 is integrally formed with the chest plate 22. For example, in the case where the chest plate 22 and the latchplate stability component 50 are made from moldable plastic and/or composite materials, latchplate stability component 50 can be formed with the chest plate 22. In some embodiments, the latchplate stability component 50 is removably attached to the chest plate 22. For example, the latchplate stability component 50 may be attached to the chest plate 22 using fasteners, such as screws, bolts, rivets, and the like.

In the illustrated embodiments, the latchplate 46 is inserted into the channel of the latchplate stability component 50 vertically and the channel provides a hard stop for the upward vertical movement of the latchplate 46. This hard stop acts as a safety feature as any accidental or unintended retraction of the buckle 48 will merely allow the leg 26 to fall downward out of the chestplate. In other configurations, such as where the latchplate 46 is configured to be inserted downwardly vertical into the latchplate stability component 50, the accidental or unintended retraction of the buckle 48 allows the leg 26 to slide upwardly and hit the upper chest or face area of the user. With the force exerted by the user's body on the leg 26, such an accidental or unintended movement of the leg 26 upward could cause serious injury or death to the user.

In the illustrated embodiment, the coupling interface 44 also includes a bumper 52 that acts as a stop. The bumper 52 is configured to prevent the leg 26 from rotating outside of the pivot range. In the embodiment depicted in FIG. 8, the bumper 52 is configured to contact a portion of the coupling interface 44 at a particular point of rotation of the coupling interface 44. In one example, the contact between the bumper 52 and the latchplate 46 defines the lowest point at which the leg 26 can rotate (e.g., the point depicted in FIG. 3). In one embodiment, when the user U is standing vertically, the bumper 52 can prevent the leg 26 from rotating down until the leg 26 is vertical. Preventing the leg 26 from rotating down until the leg 26 is vertical can help ensure that the leg 26 does not contact the lower body of the user U, thus avoiding injury to the lower body of the user U.

The bumper 52 can also provide the ability for the user U to quickly push out (or "shoot") the leg 26. From the position depicted in FIG. 3, the user U may move to push the chest plate 22 out quickly. The interaction of the bumper 52 on the portion of the coupling interface 44 coupled to the leg 26 causes the leg 26 to quickly shoot out. As the leg 26 shoots out, the user U may move such that the distal end 32 or the foot 54 touches a surface (e.g., a wall or the ground) at a desired position. This ability to shoot the leg 26 adds to the safety of the support device 20 because the user U can quickly set the leg 26 if necessary and it adds to the convenience of the support device 26 because it reduces the amount of time to set up the support device 20. In some embodiments, the bumper 52 is configured from a rigid material (e.g., a metal material or a hard plastic material) or a semi-rigid material (e.g., an elastomeric material). In some embodiments, the user is able to feel the point at which the leg 26 hits the bumper 52 and the bumper 52 acts as a predictable governor for the user. In some embodiments, when the user is working horizontally, the bumper 52 provides a resistance point that helps a user prevent the user's face from hitting ground.

In another embodiment, the proximal end 30 of the leg 26 may be configured to contact a stop 56 on the chest support device to prevent the leg 26 from rotating higher than the pivot range. For example, when the leg 26 is substantially perpendicular to the chest plate 22 (as shown in FIG. 2), the proximal end 30 of the leg 26 can contact the stop 56 and prevent the leg 26 from rotating any further. Preventing the leg 26 from rotating beyond the horizontal position shown in FIG. 2 can help ensure that the leg 26 does not contact the upper body of the user U, thus avoiding injury to the upper body of the user U. In one embodiment, the stop 56 is formed as a part of the chest plate 22 and/or the latchplate stability component 50. In another embodiment, the stop 56 is formed from a rigid material, such as a metal material or a hard plastic material.

Figure 19:
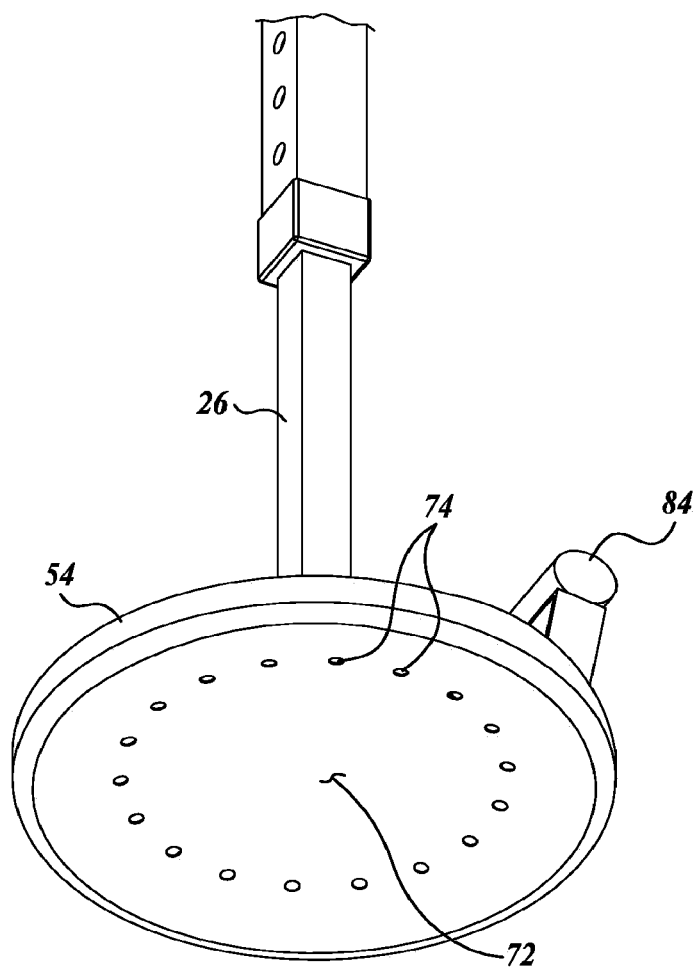
FIGS. 19 to 20 depict an embodiment of a foot, usable with the embodiments of support devices described herein, that has a concave surface and a handle.
Figure 20:
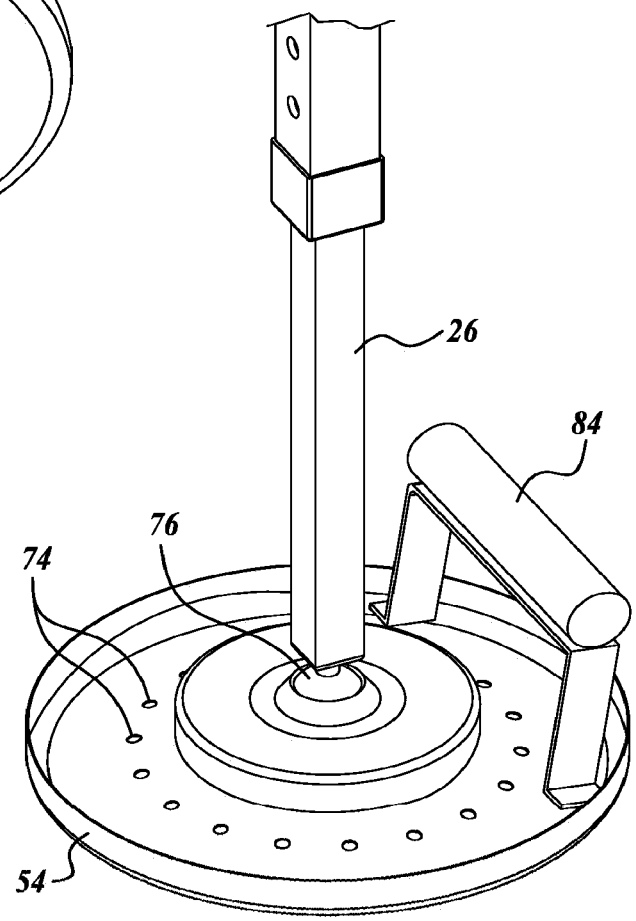

In some embodiments, the support device 20 also includes a foot 54 attached to the distal end 32 of the leg 26. The foot 54 can be configured from a semi-rigid material, such as rubber, that protects the distal end 32 of the leg 26 and resists movement of the distal end 32 of the leg 26 against a surface (e.g., a wall or the ground). In the illustrated embodiment, the foot 54 is substantially larger than the distal end 32 of the leg 26. Such an embodiment can distribute the force exerted by the user's weight over a large area and protect both the leg 26 and the surface against which the foot 54 is in contact. In addition, in the illustrated embodiment, the foot 54 is concave, allowing the foot 54 to roll somewhat against a surface as the user U adjusts the user's position and/or weight distribution. In another embodiment that is not depicted, the foot 54 is similar in size to the distal end 32 of the leg 26. For example, the foot 54 can be similar in size to the foot of a crutch or cane. In some embodiments, the diameter of the foot is in a range from about 1 inch (e.g., about the size of a crutch foot) to about 8 inches. In other embodiments, the diameter of the foot is about 4 inches or about 6 inches. In another embodiment, as depicted in FIGS. 19 and 20, the foot 54 has a concave surface 72. A concave surface 72 may be advantageous in certain circumstances, such as when the foot 54 is placed against a soft surface, such as semi-cured cement. Such a concave surface 72 may minimize any marks or cavities in the finished concrete. In one example, the convex surface of the foot 54 has a plurality of holes 74. The plurality of holes 74 allow air to pass in and out of the convex area of the foot 54 such that area between the foot 54 and the surface does not have negative pressure (i.e., to prevent the convex area of the foot 54 from acting as a suction cup). In the illustrated embodiment, the foot 54 includes a handle 84. The handle 84 allows the user to twist the foot 54 as it is being lifted up from a surface to further prevent a negative pressure suction. The handle 84 also provides the user with a leverage point to hold while the user is working (e.g., while the user is finishing concrete in the position depicted in FIG. 4). The handle 84 also allows the user to hold the entire detachable leg when the detachable leg is uncoupled from the chest plate.

In some embodiments, such as in the illustrated embodiment, the foot 54 is fixed to the leg 26 such that any rotation of the leg 26 will cause a corresponding rotation of the foot 54. In another embodiment, the foot 54 is coupled to the distal end 32 of the leg 26 via a hinge or joint, such as a ball joint 76. Such a hinge or joint may give the user U a greater range of motion while using the support device 20. However, the greater range of motion may also result in less stability. The range of motion allowed by the hinge or joint may be limited (e.g., using stops to limit the range of possible angles of the hinge or joint) to give better stability than with unlimited range of motion.

One benefit of the ability to decouple the leg 26 from the chest plate 22 is that the user U can remove the leg 26 from the chest plate 22 without having to remove the entire support device 20. For example, the user U may use the support device 20 at one location and then move to another location to use the support device 20. It may be desirable to move from one location to another without the leg 26 attached to the user's chest. However, it may also be desirable not to remove the chest plate 22 from the user's chest merely to move from one location to another. In such a case, the user may remove the leg 26 from the chest plate 22 at the first location, move to the second location with the chest plate 22 still attached to the user's chest, and then couple the leg 26 to the chest plate 22 at the second location.

Another example of a benefit of a leg 26 that decouples from the chest plate 22 is that multiple different legs may be used with the same chest plate 22. For example, the user may prefer a particular characteristic of the leg 26 when performing one type of work (e.g., finishing concrete) and a different characteristic of the leg 26 when performing another type of work (e.g., laying tile). A characteristic of the leg 26 can be one or more of a specific length of the leg 26, a particular foot 54 on the distal end 32 of the leg, a particular pivot range of the foot 54 with respect to the leg 26, and so forth. The user may have a different leg for different types of work that the user performs and use the different legs with the same chest plate 22 interchangeably. Thus, the user can use the same chest plate 22 and couple different legs to the chest plate 22 depending on the type of work that the user will be performing. A user can couple one leg to the chest plate 22 to perform one task, decouple that leg from the chest plate 22, and couple another leg to the chest plate 22 to perform another task. The ability to continue wearing the same chest plate 22 when switching legs and/or types of work can save time and add to the overall convenience of the support device 20 to the user.

Figure 12:
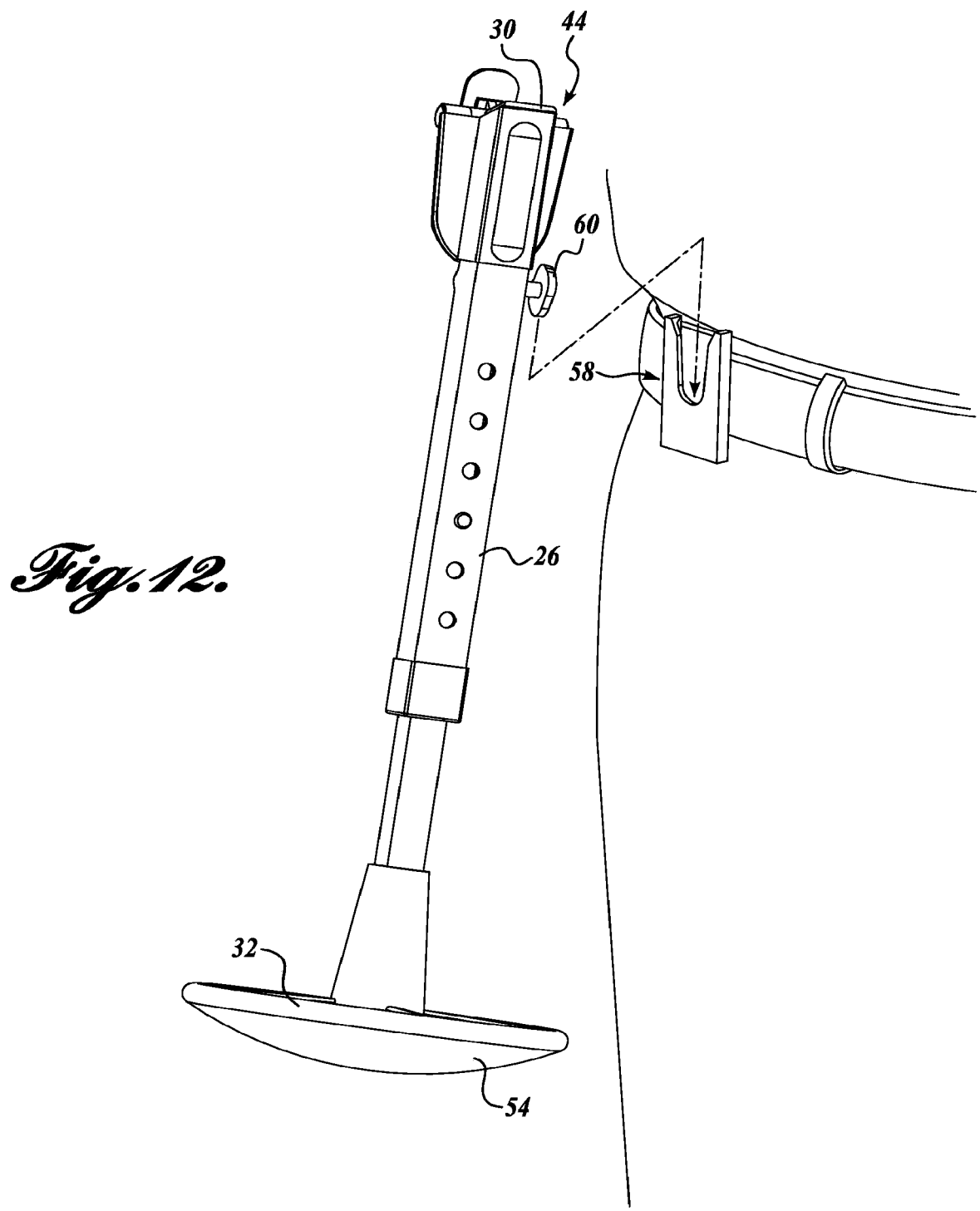
FIG. 12 depicts an embodiment of a leg carrying device configured to carry a detachable leg of a support device when the leg is detached from a chest plate.

FIG. 12 depicts an embodiment of a leg carrying device 58 that can be used to carry the leg 26 when it is removed from the chest plate 22. The leg carrying device 58 is configured to receive a knob 60 located on the leg 26. The knob 60 can be inserted through a channel in the leg carrying device 58. The leg carrying device 58 permits the leg 26 to rotate about the knob 60. This provides a natural movement of the leg 26 when the user is performing certain activities, such as walking. The leg carrying device 58 can optionally include a buckle mechanism that prevents unintended removal of the leg 26 from the leg carrying device. The buckle mechanism also prevents unintended damage as a result of the leg 26 being unintentionally removed from the buckle mechanism, such preventing damage to work areas (e.g., airplane floors during assembly), preventing the leg 26 from falling from high locations (e.g., from hitting people or equipment when the user is working at heights), or preventing any other type of damage that could be caused by the leg 26 being loose.

In another example, the user U may use the leg 26 for support against a wall, but then need to perform other work that does not benefit from use of the leg 26. In this case, the user may remove the leg 26 from the chest plate 22 and couple the leg 26 to the leg carrying device 58 while performing the work that does not benefit from use of the leg 26. The user U can continue to wear the chest plate 22 while performing the other work and then later couple the leg 26 back to the chest plate 22 when the user U again desires to use the leg 26.

In one embodiment, as shown in FIGS. 13-18, the leg 26 includes an angle stabilization mechanism 62 configured to limit or prevent pivoting of the leg 26 with respect to the chest plate 22. The angle stabilization mechanism 62 includes a latchplate 64 hingedly coupled to the chest plate 22 and a channel 66 fixed to the leg 26. In some embodiments, the latchplate 64 includes a number of latch points 68. In the illustrated embodiments, the latch points 68 are in the form of three holes in the latchplate 64. In one embodiment, the channel 66 includes a releasable buckle 70 that is configured to selectively engage one of the latch points 68.

Figure 13:
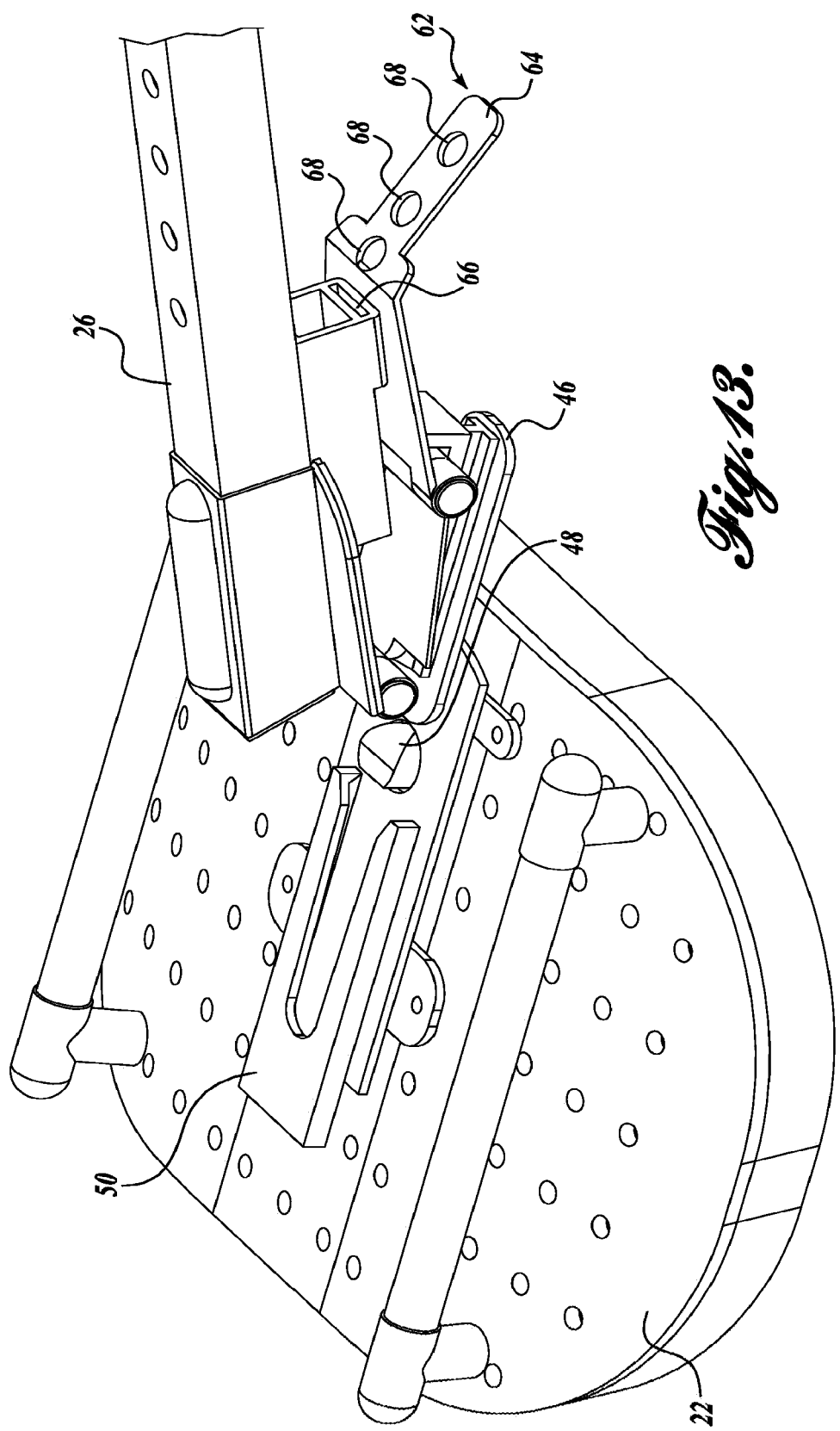
FIGS. 13 to 18 depict an embodiment of a detachable leg with an angle stabilization mechanism that can be used with the embodiments of support devices described herein.
Figure 14:
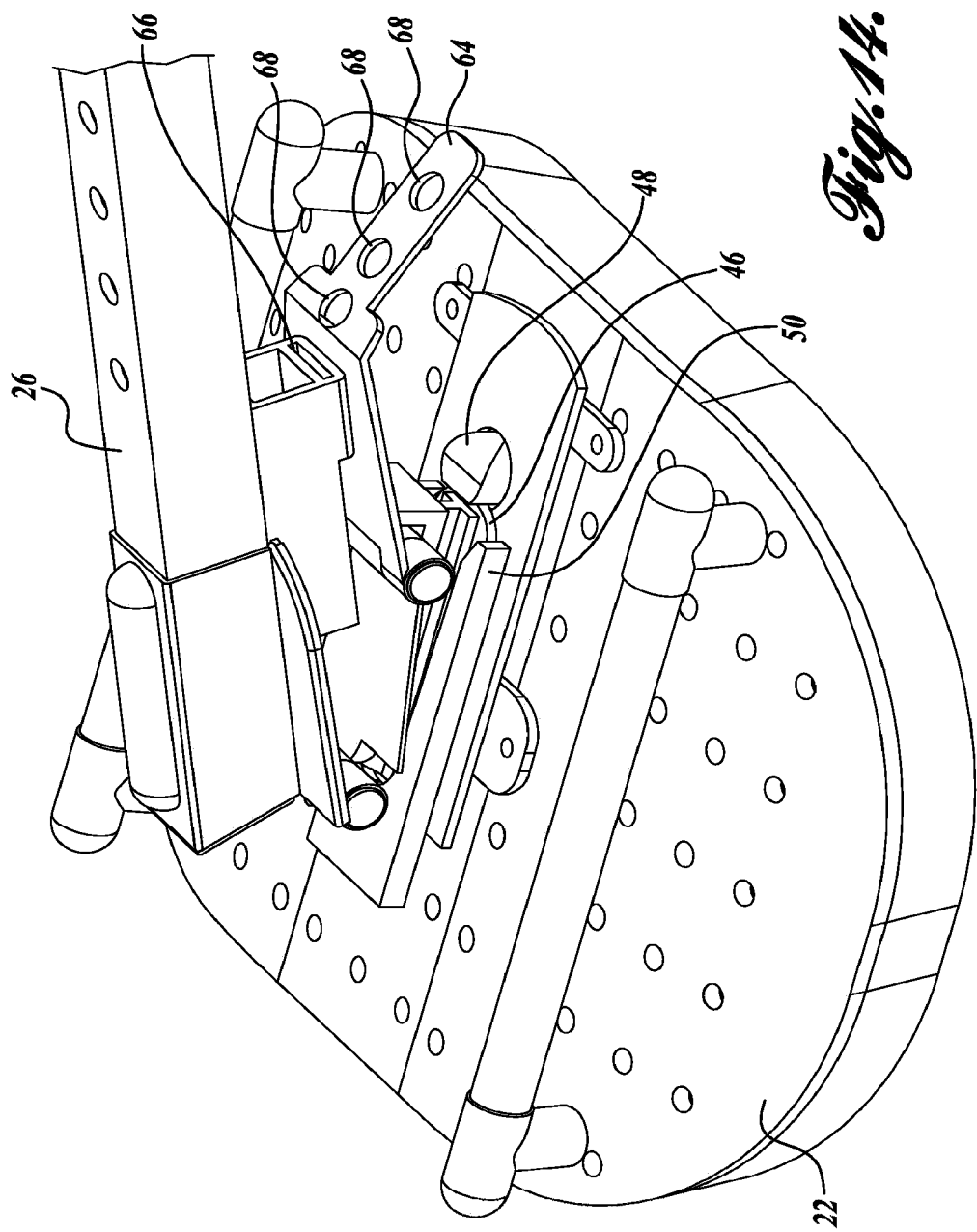
Figure 15:
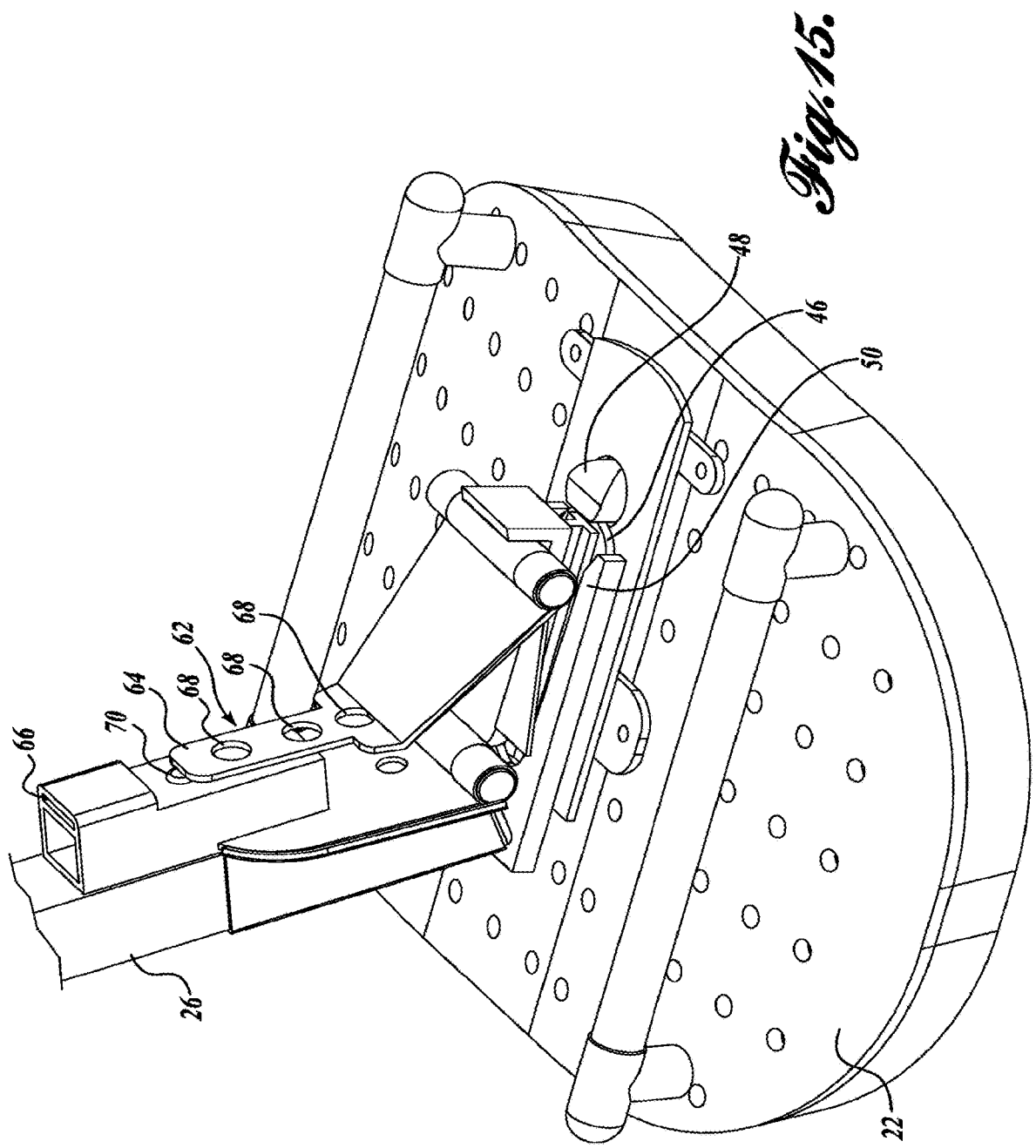

In one example of operation of the angle stabilization mechanism 62, latchplate 46 is slid from the point shown in FIG. 13 into the latchplate stability component 50 until the latchplate 46 is coupled to the releasable buckle 48 in the point shown in FIG. 14. The latchplate 64 and the leg 26 are then rotated from the point depicted in FIG. 14 to the point depicted in FIG. 15. The latchplate 64 is too long to be inserted into channel 66 until it reaches the point depicted in FIG. 15. At that point, the latchplate 64 is capable of being inserted into the channel 66.

Figure 16:
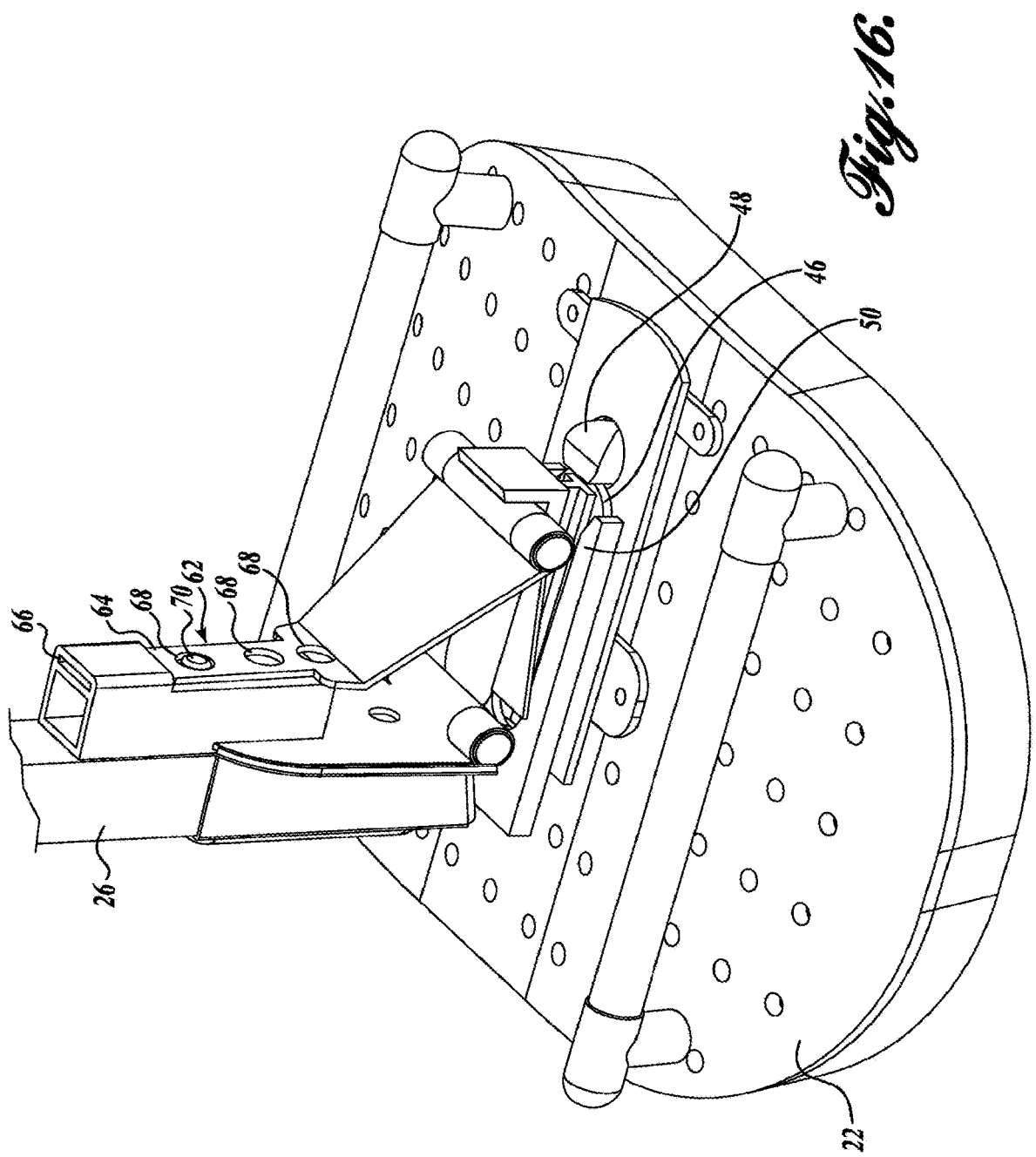

With the latchplate 64 inserted into the channel 66, the latchplate 64 and the leg 26 are rotated back to the point depicted in FIG. 16 where the releasable buckle 70 engages a first latch point 68 on the latchplate 64. The engagement of the releasable buckle 70 and the first latch point 68 substantially prevents rotation of the leg 26 with respect to the chest plate 22. In the embodiment shown in FIG. 16, the leg 26 is substantially perpendicular to the chest plate 22.

Figure 17:
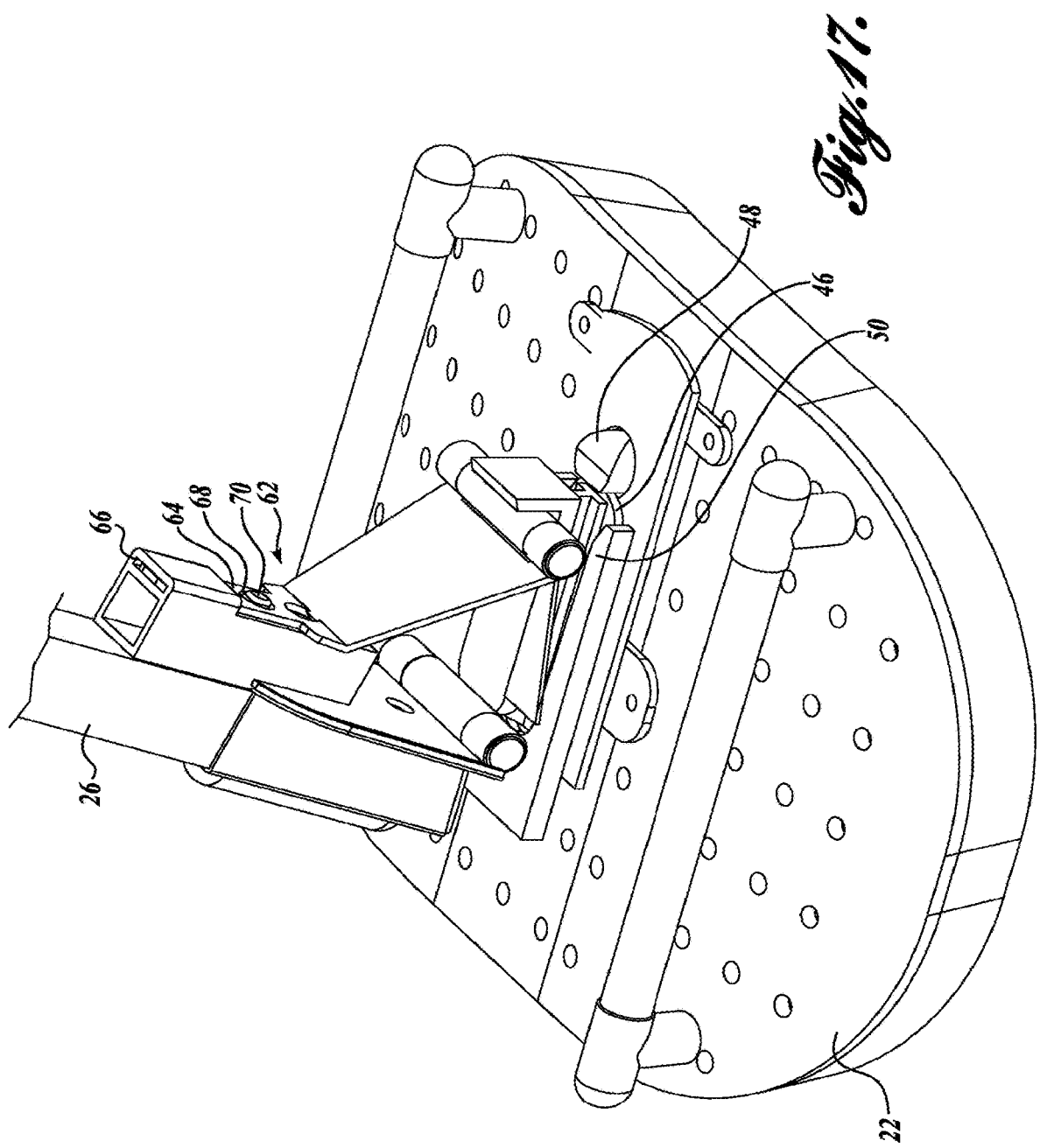

In the case where the latchplate 64 includes multiple latch points 68, as in the illustrated embodiment, the releasable buckle 70 can be disengaged from the first latch point 68 and the latchplate 64 and the leg 26 can be further rotated to the point depicted in FIG. 17 where the releasable buckle 70 engages a second latch point 68 on the latchplate 64. The engagement of the releasable buckle 70 and the second latch point 68 substantially prevents rotation of the leg 26 with respect to the chest plate 22. In the embodiment shown in FIG. 17, the leg 26 is not perpendicular to the chest plate 22. In one example, in the arrangement shown in FIG. 17, the leg 26 is an angle of about 55 degrees with respect to the chest plate. The releasable buckle 70 can then be disengaged from the second latch point 68 and the latchplate 64 and the leg 26 can be further rotated to the point depicted in FIG. 18 where the releasable buckle 70 engages a third latch point 68 on the latchplate 64. The engagement of the releasable buckle 70 and the third latch point 68 substantially prevents rotation of the leg 26 with respect to the chest plate 22. In the embodiment shown in FIG. 18, the leg 26 is not perpendicular to the chest plate 22. In one example, in the arrangement shown in FIG. 17, the leg 26 is at an angle of about 20 degrees with respect to the chest plate.

Figure 18:
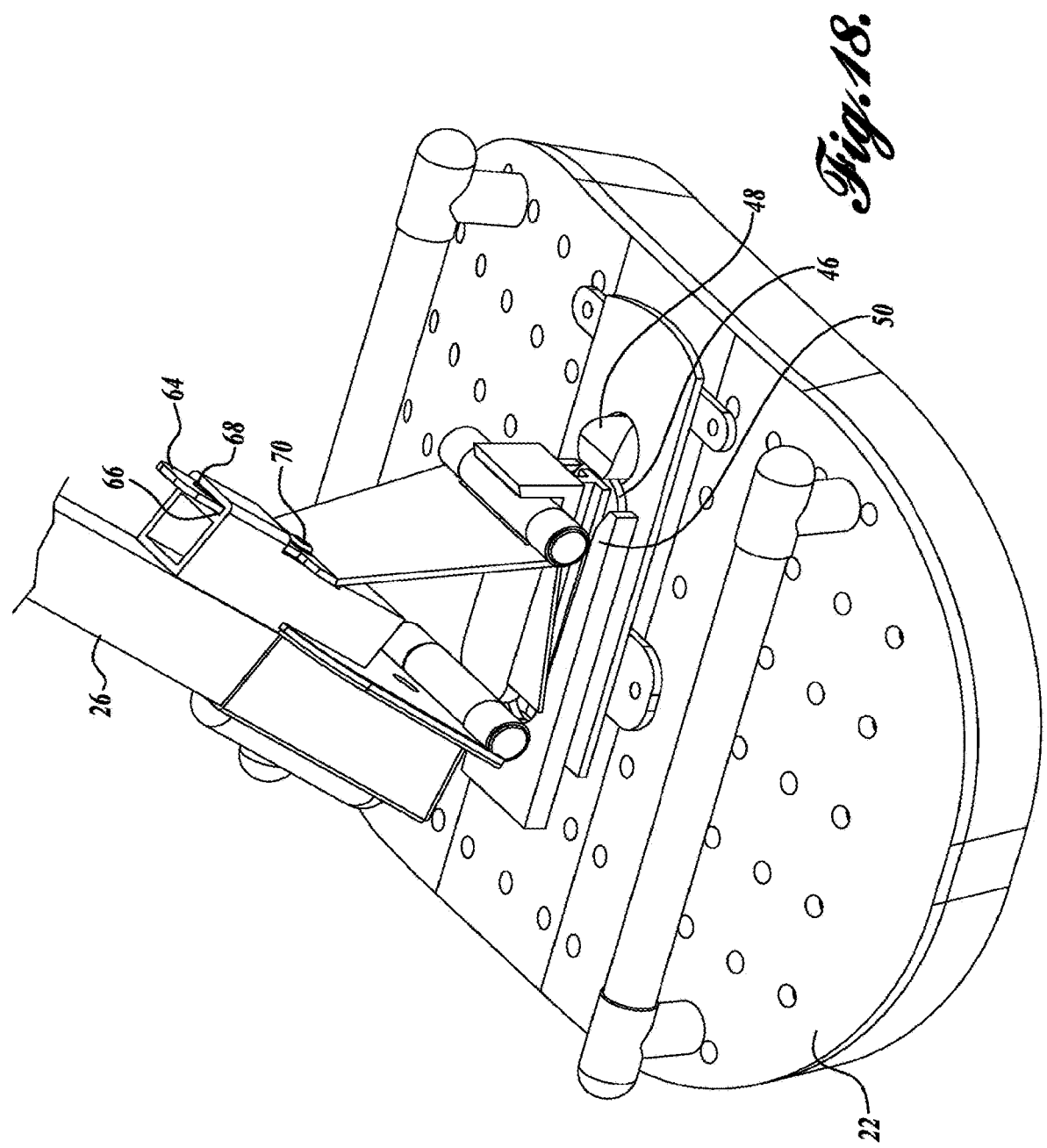

In one embodiment, the leg 26 in FIG. 18 is at an angle of about 60 degrees from vertical. In another embodiment, the angle stabilization mechanism 62 is configured to fix the leg 26 with respect to the chest plate 22 at one or more positions having an angle in the range from about 20 degrees to about 90 degrees from vertical in a single plane perpendicular to the chest plate 22.

Other embodiments of angle stabilization mechanisms, beyond the angle stabilization mechanism 62 depicted in FIGS. 14-18, can be used to limit or prevent pivoting of the leg 26 with respect to the chest plate 22.

As described above, the leg 26 may pivot with respect to each of the chest plate 22 and the foot 54. In some embodiments, the leg 26 may pivot freely (e.g., in the case of a ball joint or a hinge without stops) or rotation of the leg 26 may be limited (e.g., with the use of stops). As also described above, rotational movements of the leg 26 may be fixed with respect to each of the chest plate 22 and the foot 54 (e.g., with a fixed foot or with the use of an angle stabilization mechanism). During use of the support device 20, and combination of pivoting and/or fixed ends of the leg 26 are possible. In one example, the proximal end 30 of the leg 26 is fixed with respect to the chest plate 22 and the distal end 32 of the leg 26 is fixed with respect to the foot 54. In another example, the proximal end 30 of the leg 26 is pivotable with respect to the chest plate 22 and the distal end 32 of the leg 26 is fixed with respect to the foot 54. In another example, the proximal end 30 of the leg 26 is fixed with respect to the chest plate 22 and the distal end 32 of the leg 26 is pivotable with respect to the foot 54. In yet another example, the proximal end 30 of the leg 26 is pivotable with respect to the chest plate 22 and the distal end 32 of the leg 26 is pivotable with respect to the foot 54.

While illustrative embodiments have been illustrated and described, it will be appreciated that various changes can be made therein without departing from the spirit and scope of the claimed subject matter.

The detailed description set forth herein in connection with the drawings is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The embodiments of the present disclosure in which an exclusive property or privilege is claimed are defined as follows:

1. A method of using a body support device, the method comprising:
    attaching a body attachment portion to a body of a user, the body attachment portion having a first side and a second side, wherein the first side couples with the body of the user and the second side faces away from the body of the user, wherein the second side includes at least one receiving channel;
    releasably coupling a leg assembly with the body attachment portion, the leg assembly including an elongate member having an elongate body having a central longitudinal axis, the elongate member configured for hinged movement between extended and retracted positions, and the leg assembly including a coupling interface configured to allowing hinged movement between extended and retracted positions relative to the body attachment portion, wherein the leg assembly releasably couples with the body attachment portion by sliding at least a portion of the coupling interface within the at least one receiving channel on the body attachment portion; and
    hingedly moving the elongate member between the extended and retracted positions.

2. The method of claim 1, wherein the coupling interface includes a first hinging portion and a second hinging portion.

3. The method of claim 2, wherein the second hinging portion is configured for pivotal movement relative to the first hinging portion.

4. The method of claim 3, wherein the second hinging portion is coupled to the elongate member, such that the elongate member is configured for hinging movement between extended and retracted positions.

5. The method of claim 2, wherein sliding at least a portion of the coupling interface within the at least one receiving channel on the body attachment portion includes sliding at least a portion of the first hinging portion within the at least one receiving channel on the body attachment portion.

6. A method of using a body support device, the method comprising:
    attaching a body attachment portion to a body of a user, the body attachment portion having a first side and a second side, wherein the first side couples with the body of the user and the second side faces away from the body of the user, wherein the second side includes a first coupling member;
    releasably coupling a leg assembly with the body attachment portion, the leg assembly including an elongate member configured for hinged movement between extended and retracted positions, and the leg assembly including a second coupling member configured for interfacing with the first coupling member, wherein the leg assembly releasably couples with the body attachment portion by coupling the second coupling member with the first coupling member;
    adjusting the leg assembly to a predetermined position between the extended position and the retracted position; and
    locking the leg assembly in the predetermined position with a locking assembly.

7. The method of claim 6, wherein the second coupling member is configured to allow hinged movement of the elongate member between the extended and retracted positions.

8. The method of claim 6, wherein the second coupling member is configured to slidably attach to the first coupling member.

9. The method of claim 8, wherein the first coupling member is a receiving channel.

10. The method of claim 6, wherein the locking assembly includes a locking arm extending between the leg assembly and the body attachment portion.

11. The method of claim 10, wherein the locking arm is configured to prevent the elongate member from pivoting relative to the body attachment portion.

12. A method of using a body support device, the method comprising:
    attaching a body attachment portion to a body of a user, the body attachment portion having a first side and a second side, wherein the first side couples with the body of the user and the second side faces away from the body of the user, wherein the second side includes a first coupling member;
    releasably coupling a leg assembly with the body attachment portion, the leg assembly including a second coupling member configured for interfacing with the first coupling member to releasably couple the leg assembly with the body attachment portion, wherein the leg assembly releasably couples with the body attachment portion by slidably attaching the second coupling member with the first coupling member.

13. The method of claim 12, wherein the second coupling member is configured to allow hinged movement of the leg assembly between an extended position and a retracted position.

14. The method of claim 12, wherein the first coupling member is a receiving channel.

15. The method of claim 14, wherein the second coupling member is configured to be slidably received by the receiving channel.

* * * * *